Nov. 29, 1960 A. J. RADCLIFFE, JR., ET AL 2,962,557

RELAYLESS LINE CIRCUIT AND CALL DISTRIBUTING SYSTEM

Filed July 17, 1958 6 Sheets-Sheet 1

INVENTOR
A. J. RADCLIFFE, JR
M. RIBNER
BY W. V. SAYNER
Robert Hardis Jr.
ATTORNEY Nov. 29, 1960 A. J. RADCLIFFE, JR., ET AL 2,962,557

RELAYLESS LINE CIRCUIT AND CALL DISTRIBUTING SYSTEM

Filed July 17, 1958

6 Sheets-Sheet 2

INVENTOR
A. J. RADCLIFFE, JR
M. RIBNER
BY W. V. SAYNER
Robert Harding Jr.
ATTORNEY Nov. 29, 1960 A. J. RADCLIFFE, JR., ET AL 2,962,557

RELAYLESS LINE CIRCUIT AND CALL DISTRIBUTING SYSTEM

Filed July 17, 1958

6 Sheets-Sheet 3

INVENTOR
A. J. RADCLIFFE, JR
M. RIBNER
BY W. V. SAYNER

Robert Harding Jr.
ATTORNEY

INVENTOR
A. J. RADCLIFFE, JR.
M. RIBNER
BY W. V. SAYNER
Robert Harding Jr.
ATTORNEY

CIVILIAN LINE CIRCUIT

INVENTOR
A. J. RADCLIFFE, JR
M. RIBNER
BY W. V. SAYNER
Robert Harding Jr.
ATTORNEY INVENTOR
A. J. RADCLIFFE, JR.
M. RIBNER
BY W. V. SAYNER
Robert Harding Jr.
ATTORNEY

United States Patent Office 2,962,557

Patented Nov. 29, 1960

2,962,557

RELAYLESS LINE CIRCUIT AND CALL DISTRIBUTING SYSTEM

Arthur Julius Radcliffe, Jr., La Grange, Morris Ribner, Chicago, and William Vlastimil Sayner, La Grange, Ill., assignors to International Telephone and Telegraph Corporation, New York, N.Y., a corporation of Maryland Filed July 17, 1958, Ser. No. 749,240

11 Claims. (Cl. 179—18)

This invention relates to telephone systems and particularly to the line circuits and call distributor circuits for automatically connecting an incoming call to a link in a lightweight manual telephone central office.

One object of the invention is to provide a relayless line circuit using transistors.

Another object of the invention is to provide a relayless trunk circuit using transistors.

Another object of the invention is to provide a call distributing circuit in which the distribution is accomplished automatically by means of transistors operating sensitive relays.

Another object of the invention is to provide a link allotter circuit in which automatic means is provided for connecting an incoming call to a free one of a plurality of links.

Another object of the invention is to provide a link allotter circuit having a plurality of stages which will step from stage to stage until a stage associated with a free link is found.

Another object of the invention is to provide a link allotter circuit having a plurality of stages including a "hold" stage for stopping the sequential operation of the stages at the "hold" stage when all the links are busy.

Another object of the invention is to provide a novel crosspoint matrix for a telephone central office for connecting incoming calls in sequence to an allotted link of a plurality of free links.

The above-mentioned and other features and objects of this invention and the manner of attaining them will become more apparent and the invention itself will be best understood by reference to the following description of an embodiment of the invention taken in conjunction with the accompanying drawings, in which.

Figure 3:
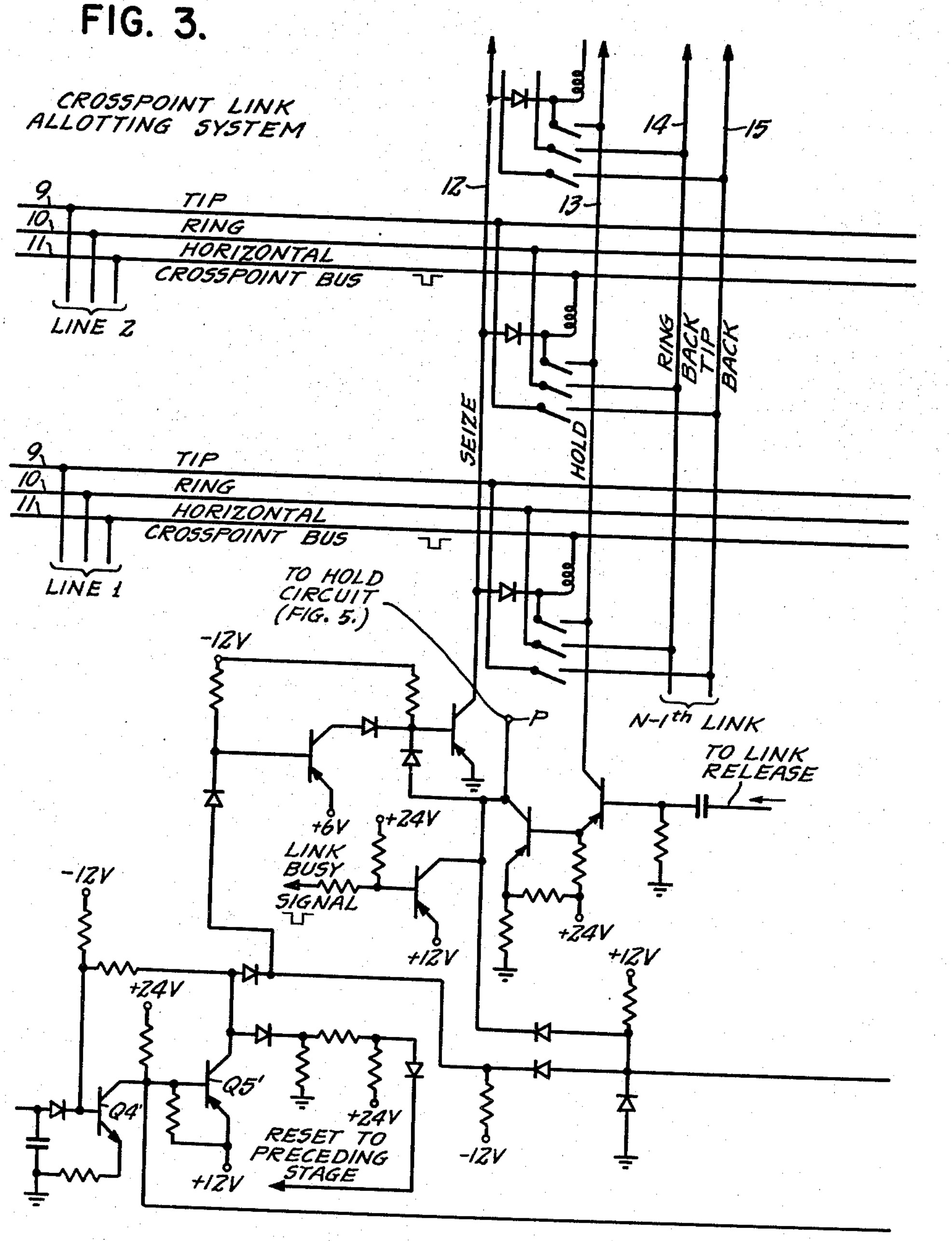
Figure 4:
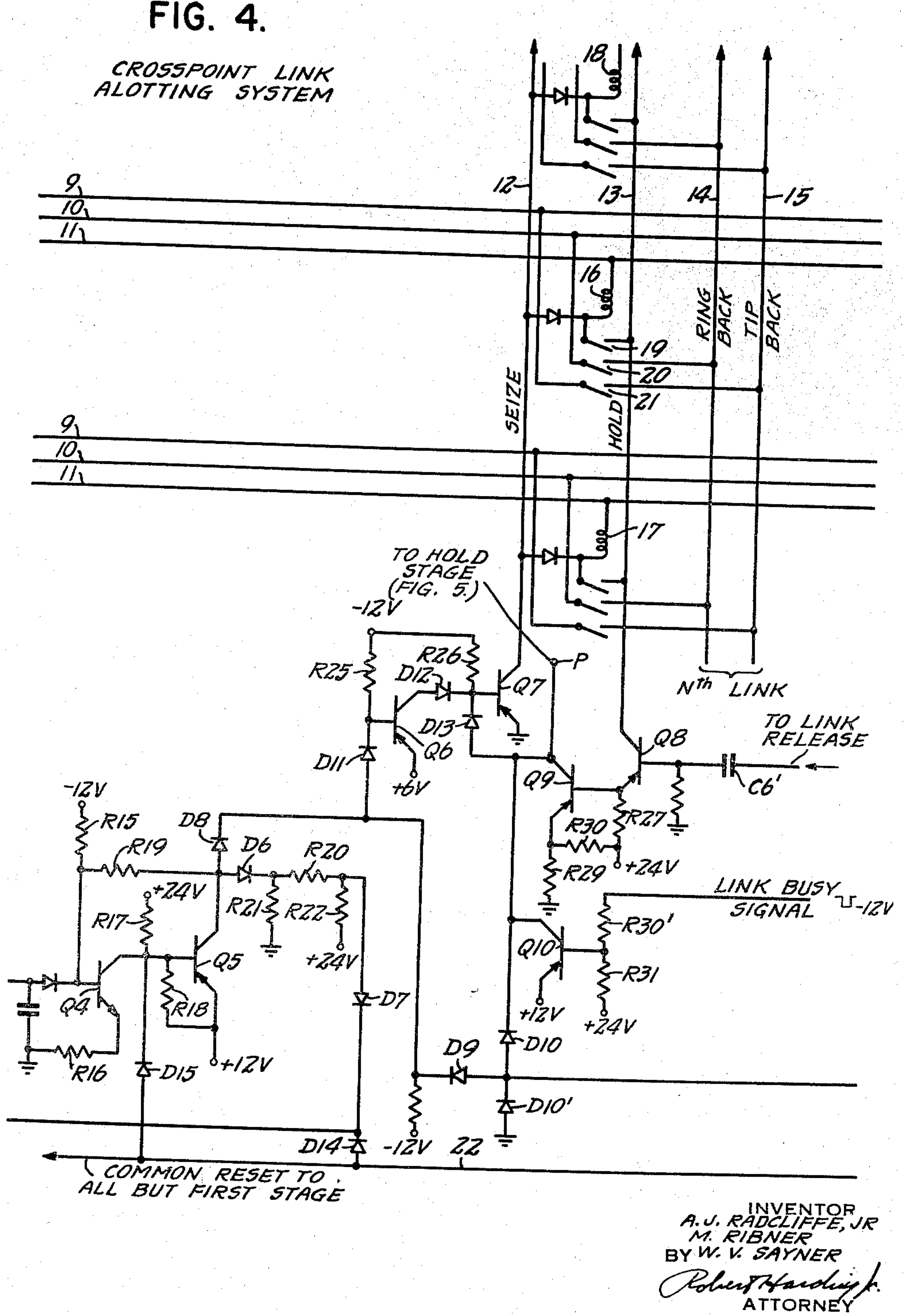
Figure 5:
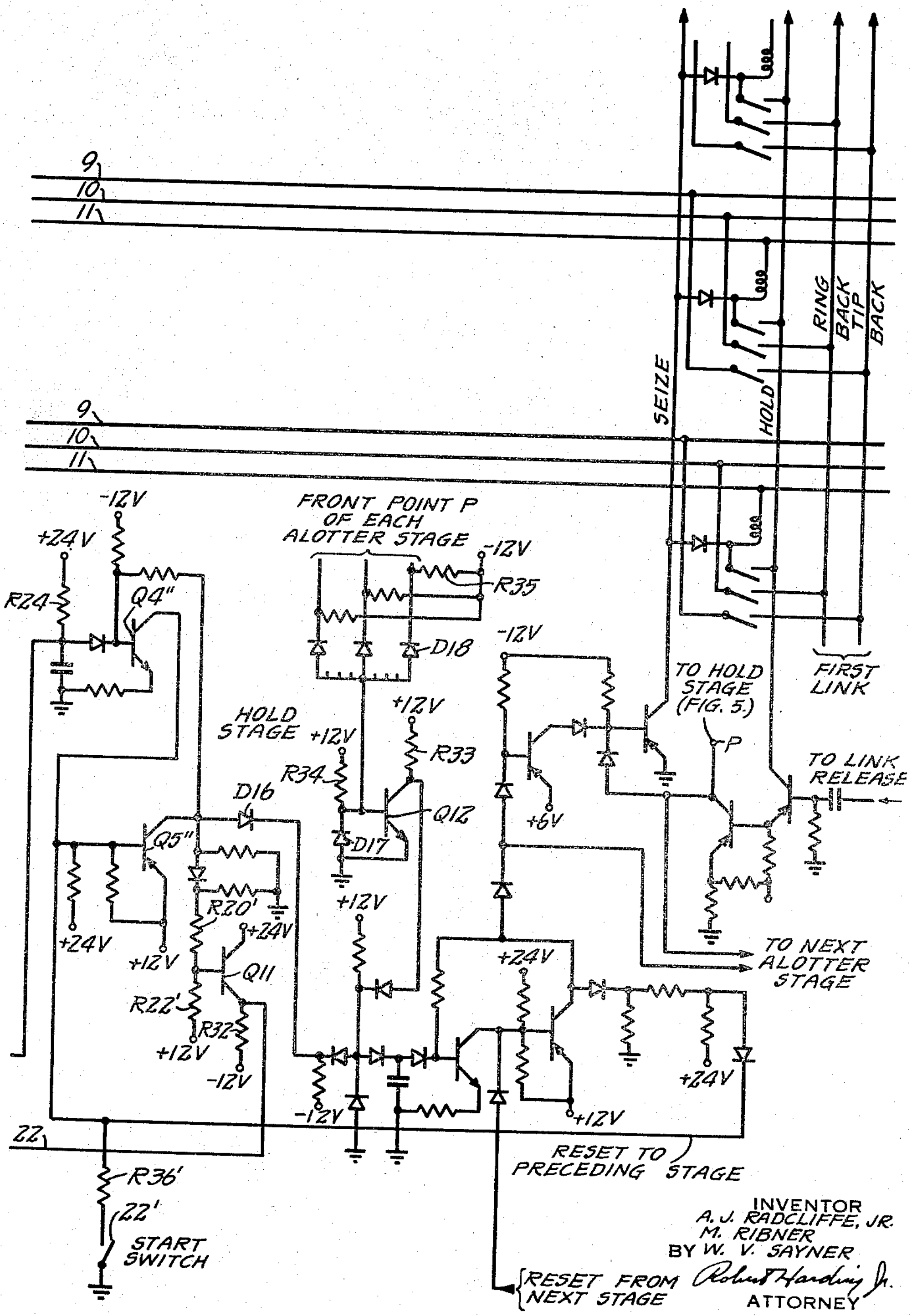
Figure 6:
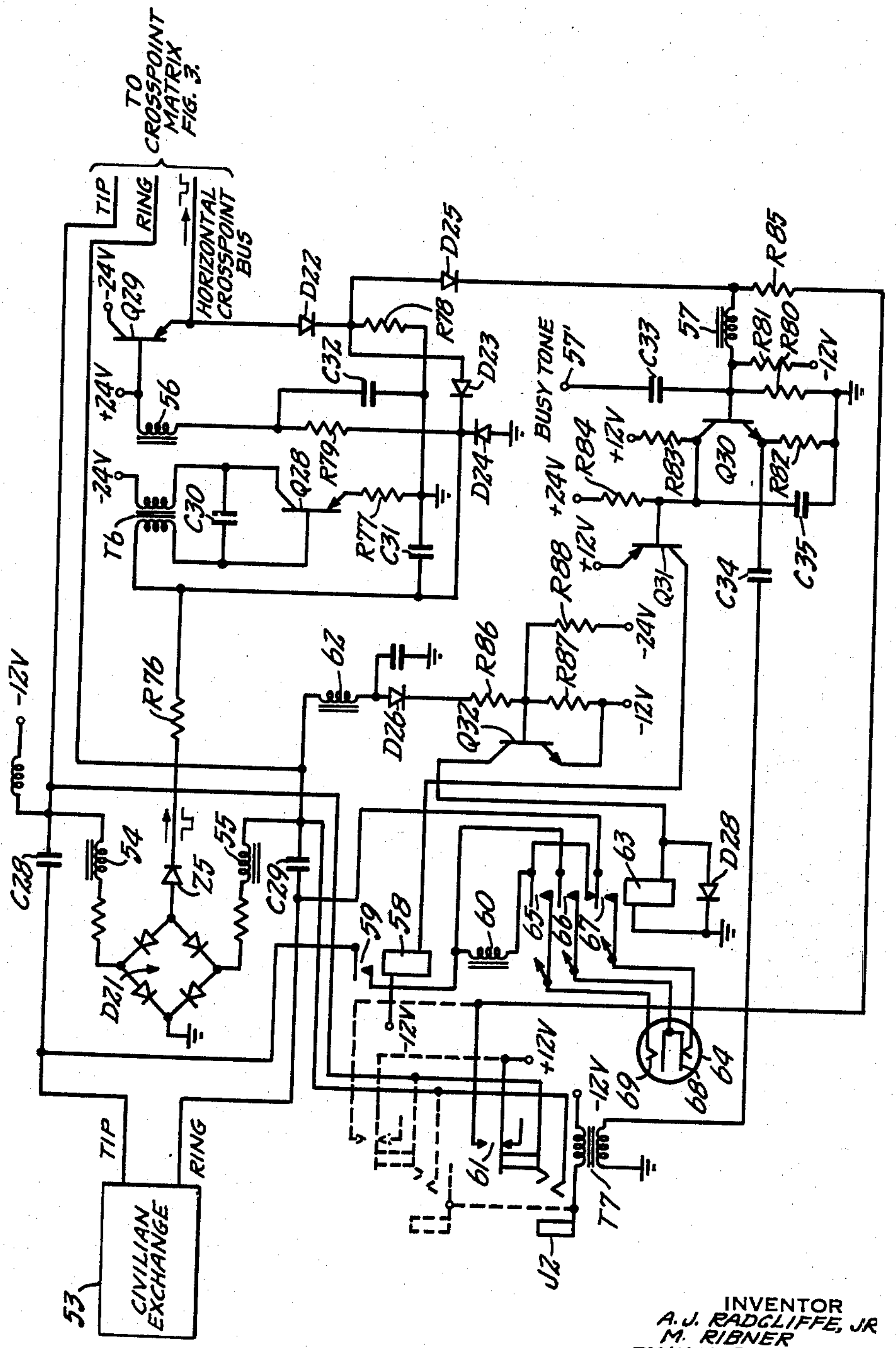

Figs. 3, 4 and 5, arranged in the order given, are a circuit diagram of the crosspoint matrix used in making the automatic part of the connection;

Fig. 6 is a circuit diagram of a civilian line circuit; and

Figure 7:
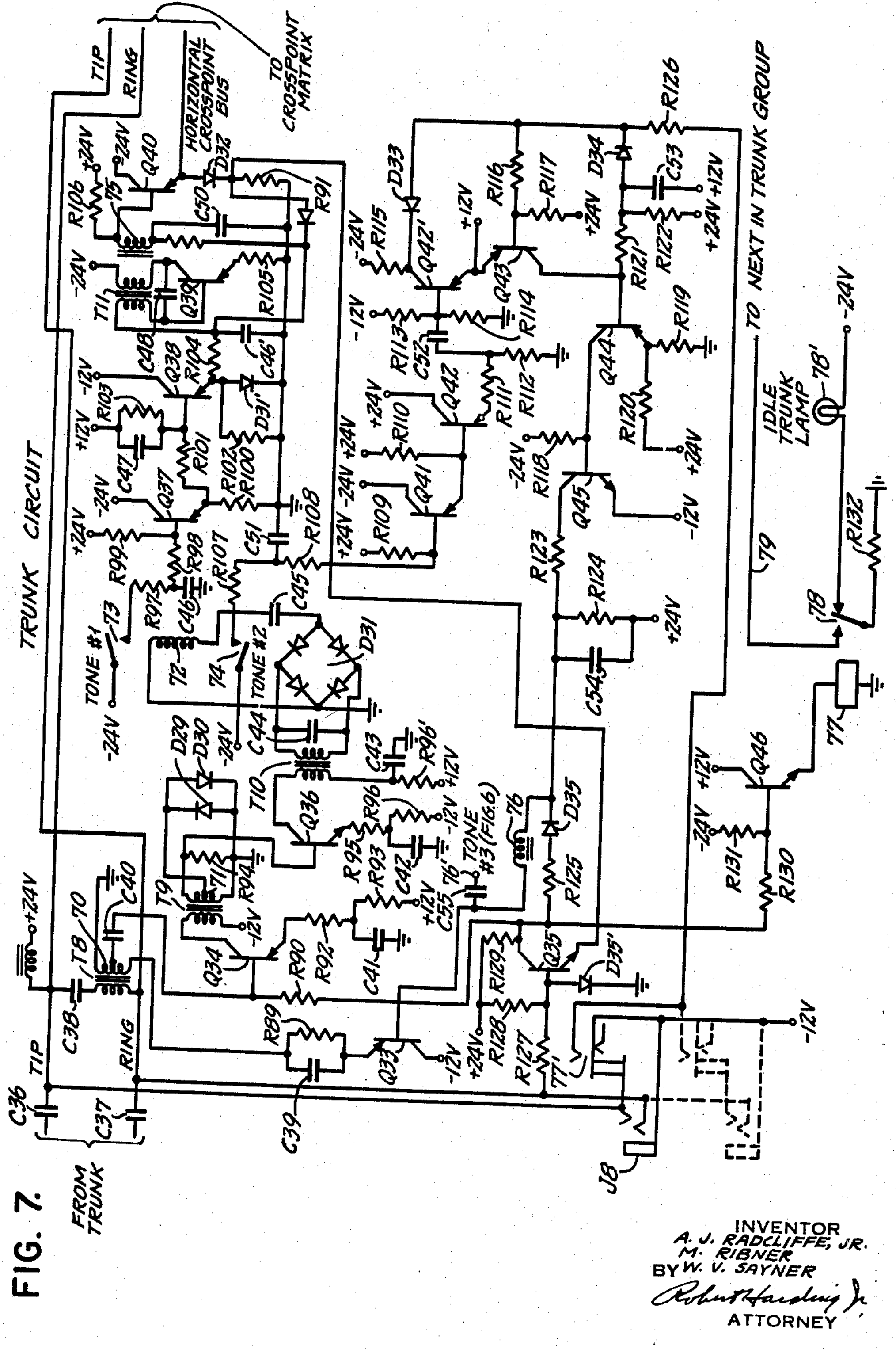

Fig. 7 is a circuit diagram of a trunk line circuit.

The invention is shown in connection with a lightweight telephone exchange having line circuits, links, and a distributing arrangement for automatically connecting a calling line circuit to a free link.

With respect to the line circuits, there are four types of line circuits: (1) CBS line circuits for connecting to lines having common battery signalling; (2) magneto line circuits for connecting to lines having magneto-operated signalling; (3) trunk circuits for connecting to trunks leading to other central offices; and (4) civilian line circuits for connecting to civilian exchanges.

The link circuits which have not been shown correspond to cord circuits in an ordinary exchange, except that a calling line is automatically connected to one end of the link, while the operator manually connects the other end to the called line by means of a plug on the end of a cord which cooperates with a jack forming part of the called line circuit. The automatic connection between the lines and the links is accomplished by means of a crosspoint matrix formed of sensitive reed relays.

An arrangement is provided for allotting links in sequence so that each incoming call will be connected to a different link and busy links are skipped over in the allotting process.

Signalling is accomplished by tones which are designated as tones No. 1, 2, and 3 having alternating current frequencies, respectively, of 221.6, 240.2, and 271.5 cycles per second, these frequencies being modulated on a carrier frequency of 1900 cycles per second as upper sidebands of that frequency. The tones are detected by reed relays which are tuned to the particular tone frequencies.

The entire circuit utilizes transistors of both the PNP type, in which the transistor is caused to conduct by driving the potential of the base more negative than that of the emitter, and the NPN type, in which the transistor is caused to conduct by driving the base more positive than the emitter. Flip-flop circuits are formed of a transistor of each type coupled together in a feedback arrangement, so that both transistors are either in the "on" condition or the "off" condition, as determined by a potential applied to the base of one of them.

The control of the various circuits is accomplished by simple "or" circuits and "and" circuits comprising diodes, preferably of the silicon type.

*CBS line circuit (Fig. 1)*

Figures 1, 2:
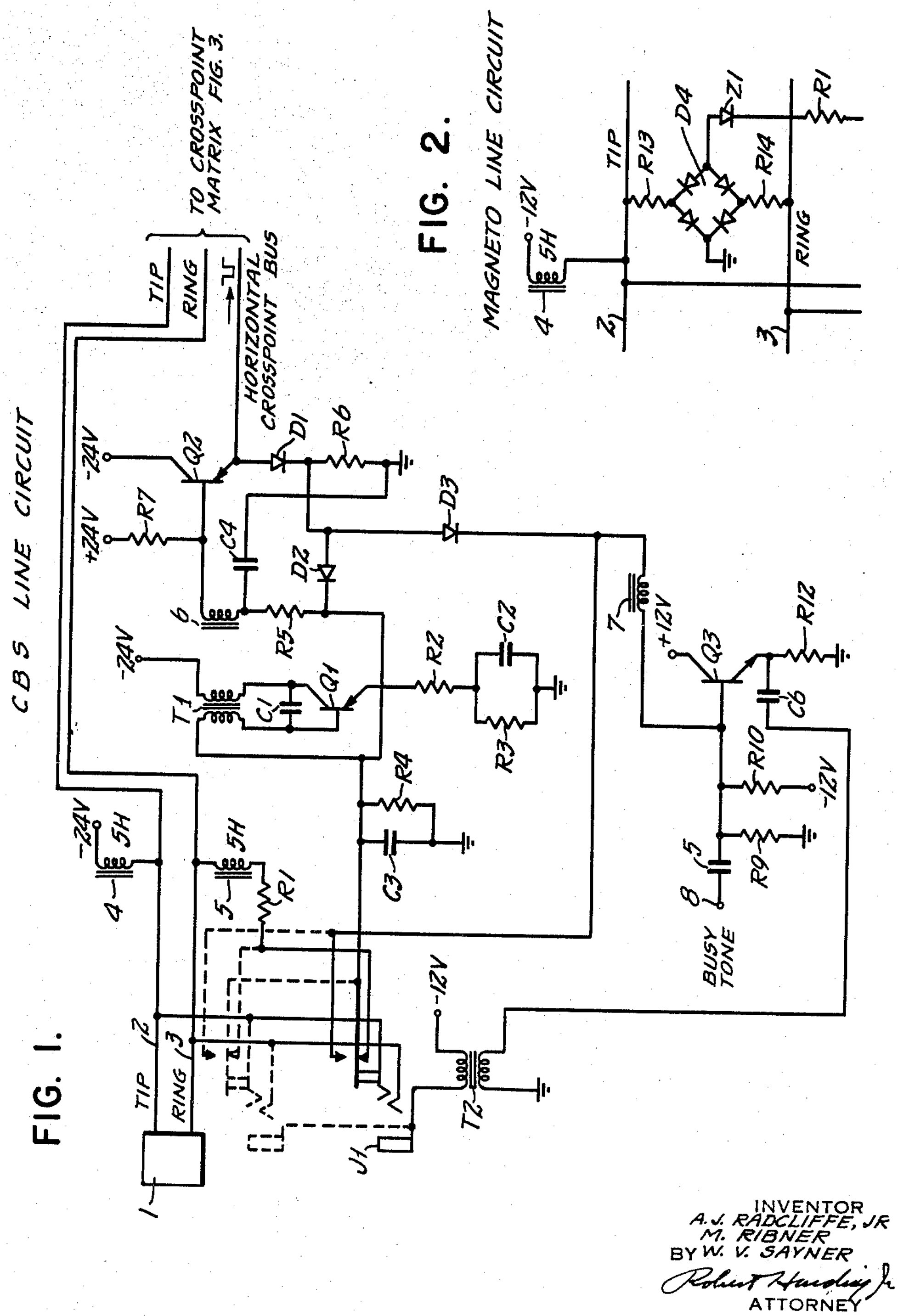
Fig. 1 is a circuit diagram of a CBS line circuit.
Fig. 2 is a partial circuit diagram of a magneto line circuit.

The CBS line circuit for connecting to the common battery signalling lines is shown in Fig. 1. Its function is to monitor the condition of the CBS line to which it is connected. When a call is made from the associated line, the line circuit produces a pulse which causes the connection of the line circuit to a link which has previously been allotted. The completion of this connection signals the operator whose headset may then become connected to the line. Another function of the line circuit is to busy the line so as to prevent it from being seized when the line to which it is connected is called at the same time.

In Fig. 1, the telephone substation is represented by the rectangle 1 which is provided with two leads, 2 and 3, representing the tip and ring of the line. The tip lead 2 is connected through an inductor 4 to a potential of −24 volts. The ring lead 3 is connected through an inductor 5 and through a resistor R1 to the break contact of the jack J1, this jack being used when the CBS line is called. The movable spring of this break contact is connected through the primary of a transformer T1 to the base of a pulsing transistor Q1 which is of the PNP type, and functions to produce a negative signalling pulse when a call is initiated by the CBS line. The collector of this transistor is connected through a secondary of the transformer T1 to a potential of −24 volts, forming a feed-back connection. A capacitor C1 is connected between the base and the collector of the transistor. The emitter of the transistor Q1 is connected through a resistor R2 and a time constant circuit, consisting of a resistor R3 and a capacitor C2, to ground. A resistor R4 is connected between the movable spring of the jack contact to ground, and this resistor is shunted by the capacitor C3.

Normally a potential exists across the tip and ring leads 2 and 3 when the switch hook at the substation is closed by the telephone being hung up. When the receiver is raised from the hook to initiate a call, a relatively low resistance is placed across the ring and tip leads. This causes current to flow in the line and telephone hand set from the −24 volt potential source, through the inductor 4, the tip lead 2, the telephone substation 1, the ring lead 3, the inductor 5, resistor R1, the break contact of the jack J1, the resistor R4, to ground. The potential on the ring lead changes from positive to negative which, in turn, causes the base of the pulsing transistor Q1 to become more negative, thus causing the transistor to conduct. At the same time the capacitor C3 is charged negatively. Collector current through the secondary of the transformer T1 causes the transformer core to shift to saturation in its other direction, and a pulse of current is produced in the secondary winding 6 which drives the base of the emitter follower transistor Q2 negative for a short period of time. The collector of the transistor Q2 is connected to a potential of −24 volts, while the emitter is connected to ground through a diode D1 and a resistor R6. The emitter of the transistor Q2 is also connected to the horizontal crosspoint bus leading to the crosspoint matrix, and a short pulse of negative potential is thus delivered to this bus. This will cause the connection of this particular line circuit to an allotted link in a manner to be later described. The pulser transistor circuit is so designed that the negative pulse delivered to the crosspoint bus will be about 4 milliseconds long.

After the link has been seized, a positive potential from the allotter will appear on the horizontal crosspoint bus in a manner to be described which produces a current through the resistor R6, the ungrounded end of which is thus caused to swing in a positive direction. This positive potential is delivered by means of a diode D2, connected between the resistor R6 and the primary of the transformer T1, to the base of the transistor Q1 to cause it to swing in a positive direction so as to shut off the transistor to prevent any further negative pulses from being transmitted over the horizontal crosspoint bus.

The positive potential developed across the resistor R6 is also fed through a diode D3 and through an inductor 7 to the base of the transistor Q3 which is of the NPN type, the base being connected to ground through resistor R9 and to a potential of −12 volts through resistor R10. The last-mentioned two resistors form a voltage divider which maintains sufficient negative potential on the base of the transistor Q3 so that the transistor is normally nonconducting. When the positive potential arrives at the base, it causes the transistor Q3 to conduct, and this permits busy tone, which is applied at the terminal 8 from the busy tone generator of Fig. 7 and through the capacitor C5 to the base of transistor Q3, to appear on the emitter of this transistor. The transistor is connected as an emitter follower with the emitter connected to ground through a resistor R12. The junction of resistor R12 and the emitter of the transistor Q3 is also connected through a capacitor C6 to the primary of a transformer T2, the other end of the primary being connected to ground. When the transistor Q3 is rendered conductive, the busy tone signal on the emitter will pass through the capacitor C6, to ground through the primary of transformer T2. The secondary of the transformer T2 is connected between the sleeve of the jack J1 and a potential of −12 volts, and the busy tone signal will therefore appear on the sleeve of the jack which is an indication that this particular CBS line circuit is busy.

When this CBS line circuit is being called, the operator will test the sleeve of the jack for the busy signal by means of the plug terminating a link, as will be understood. If no busy signal is heard, the link plug may be inserted in the jack, whereupon the tip of the plug will be connected to the tip lead 2 of the line circuit and the ring of the plug will be connected to the ring lead 3 of the line circuit. At the same time the break contact of the jack will open to disconnect capacitor C3 from the ring lead 3 and to connect the capacitor C3 to the inductor 7 over the make contact of the jack. The opening of the break contact will prevent the pulsing transistor Q1 from emitting any pulses when the ringing current is introduced over the plug and jack connection, and at the same time the application of negative potential from capacitor C3 to the base of busy tone transistor Q3 will cause this transistor to conduct and place the busy tone signal on the sleeve of the jack in a manner already described.

*Magneto line circuit (Fig. 2)*

The line circuit for connecting to a magneto telephone is much the same as that just described in connection with Fig. 1. The difference in the circuits is illustrated in Fig. 2. This difference is that the choke 5 of the circuit of Fig. 1 is omitted and a rectifier bridge D4 is connected between the tip and ring leads 2 and 3 by means of resistors R13 and R14 connected respectively between the tip lead 2 and one terminal of the bridge and the ring lead 3 and the other terminal of the bridge. The third terminal of the bridge is connected to ground while the fourth terminal is connected through a Zener diode Z1 to the resistor R1. The tip lead 2 is connected through the inductor 4 to a potential of −12 volts instead of a potential of −24 volts, as in the circuit of Fig. 1.

The negative direct current signal required to cause the pulsing transistor Q1 to pulse is obtained from the bridge circuit D4 by rectifying the 20 cycle signalling burst which is produced across the tip and ring leads by the magneto. Since the tip lead potential is −12 volts, the bridge output is the sum of this voltage and that of the rectified signal. To keep the pulsing transistor from pulsing because of the quiescent negative voltage output from the bridge, the 15 volt Zener diode Z1 is placed in series with the output. The quiescent voltage on the base of transistor Q1 is thus maintained positive until a 20 cycle burst occurs. At that time the positive bias is overridden and the negative pulse on the horizontal crosspoint bus is produced in the same manner as for the common battery signalling line circuit of Fig. 1.

The difference in the biassing arrangement of the pulsing emitter Q1 exists since a continuous negative potential is not produced by the magneto circuit, and the transistor Q1 cannot be continuously biassed to conduct. Hence the RC network consisting of the resistor R3 and the capacitor C2 in the circuit of Fig. 1 is not needed and is omitted in the magneto line circuit.

*Crosspoint link allotter system (Figs. 3, 4, 5)*

Before proceeding with the description of the other line circuits and the trunk circuit which are more complicated, a description of the crosspoint matrix and allotter shown in Figs. 3, 4, and 5 will be given. The purpose of this circuit is to allot a free link for the next incoming call and to connect the line circuit on which that call is received to the allotted free link. The crosspoint matrix uses a reed relay at each crosspoint. Such a relay, termed a "Glaswitch" relay and manufactured by the Revere Corporation, was found to give good results. This relay comprises movable contact carrying reeds mounted within a solenoid wound of "Bondez" wire. The reeds may be sealed in a dust-tight container.

Shown horizontally across the upper portions of each of Figs. 3, 4 and 5 are two groups of three conductors, each group being connected at the left side of Fig. 3 to a line circuit, such as the circuit of Fig. 1, the upper conductor 9 representing the tip lead, the second conductor 10 representing the ring lead, and the third conductor 11 representing the horizontal cross-point bus. The conductors of the lower group, which have been given the same reference characters, are designated as "line 1," while the upper group has been designated as "line 2." There is one of these groups for each of the line circuits, but only two have been shown because they are all identical.

In each figure there are also groups of four vertical conductors, each of these groups being associated with a separate link circuit. In the particular central office of which this disclosure is a part, there are provisions for 15 links and 60 lines, making a total of 900 crosspoints. The four vertical conductors comprise two which are connected to the corresponding allotter stage and two which are connected to the corresponding link circuits. The two connected to the allotter stage are conductors 12 and 13 which are labelled "seize" and "hold," respectively. The other two conductors 14 and 15 are labelled "ring back" and "tip back," respectively. The "seize" conductor 12 is grounded, in a manner to be described, when the associated allotter stage is seized; the "hold" conductor 13 is given a positive potential to hold the allotter stage. The "ring back" and the "tip back" conductors 14 and 15 are used to connect the link in the backward direction to the ring and tip leads of the line circuit.

The link circuits are arranged to be allotted in sequence, the first one being allotted again after the last circuit has been seized. There is also a hold circuit between the last stage and the first stage, the function of which is to stop the continuous searching for a free link circuit if all the link circuits are busy. Because of this arrangement of the link circuits, the *n*—1th stage of *n* allotter stages is disclosed in Fig. 3, the *n*th stage is disclosed in Fig. 4, and the first stage is disclosed in Fig. 5, together with the hold stage.

Since the stages of the allotter and their connecting circuits are identical, with the exception of the first stage and the hold stage, the *n*th stage of the allotter, shown in Fig. 4, will be described, it being understood that all other preceding stages are the same.

Referring then to Fig. 4, a reed relay 16 is shown for the purpose of connecting the three conductors 9, 10 and 11 of line 2 to the vertical conductors 12, 13, 14 and 15, associated with the *n*th link. A similar relay 17 is associated with line 1, and another relay 18, shown at the top of the figure, is associated with line 3 which is not shown. These are the crosspoint relays referred to above, one of which is provided for each crosspoint.

Referring to the relay 16, associated with line 2, it will be seen that the coil of the relay is connected between the horizontal crosspoint bus 11 and the "seize" conductor 12 through a diode D5. If the "seize" conductor 12 is at substantially ground potential, a negative pulse supplied to the horizontal crosspoint bus 11 from line 2 will operate relay 16, and ground potential does appear on this seize wire when the *n*th link has been allotted, as will be explained. The switch 16 has three make contacts 19, 20 and 21. Contact 19 connects the juncture of diode D5 and the coil of the relay to the vertical hold conductor 13 for the purpose of holding the relay operated and signalling the line circuit in a manner to be described. The contact 20 connects the ring lead 10 to the ring back vertical conductor 14 of the *n*th link. The make contact 21 connects the tip lead 9 with the vertical tip back conductor 15, so that the tip and ring line leads are connected to the tip back and ring back conductors of the link.

In order to allot each link so that it may receive a call from a line circuit, the allotter stage corresponding to that link is provided with a bistable transistor flip-flop circuit comprising transistors Q4 and Q5. The transistor Q4 is of the NPN type, while the transistor Q5 is of the PNP type. Stepping action of the allotter is predicated on the activation and de-activation of the corresponding flip-flop circuit in each allotter stage. As each flip-flop is activated, it resets the previous activated flip-flop in the chain. When the link with which the activated flip-flop is associated is seized, the succeeding flip-flop stage is activated and the original one is reset. The "seize" conductor in a particular stage is activated by the flip-flop in a manner to be described and remains activated as long as its flip-flop is activated, unless the link is seized. Seizure of the link automatically de-activates the "seize" conductor in a manner to be described.

The transistor Q4 of the flip-flop under consideration has its base connected to a potential of −12 volts through a resistor R15, while its emitter electrode is connected to ground through a resistor R16. The collector of the transistor Q4 is connected directly to the base of the transistor Q5. The base of the transistor Q5 is also connected to a potential of +24 volts through a resistor R17 and to a potential of +12 volts through a resistor R18 normally to maintain a predetermined bias potential on the base. The emitter of the transistor Q5 is connected to a potential of +12 volts. The collector of the transistor Q5 is also fed back to the base of the transistor Q4 through a resistor R19. With this circuit arrangement both of the transistors are normally in the "non-conducting" or "off" condition. When the base of the transistor Q4 is made positive, this transistor becomes conducting, which causes the collector to drop in potential, thus causing the transitsor Q5 to become conducting.

Each of the flip-flops corresponding to transistors Q4 and Q5 in the several allotter stages requires two separate inputs for it to be activated. One of these inputs is from the preceding stage flip-flop output, while the other, except for the initial stage, is obtained from the preceding vertical "hold" conductor. The use of two inputs is prescribed, since using either one alone could cause false allotting. As soon as any one stage is allotted by the operation of the flip-flop pair of transistors, it causes a reset voltage to be applied to the preceding stage and one of the two required inputs to be applied to the succeeding stage. The reset voltage is produced by the collector electrode of the second transistor Q5 of the flip-flop pair. A diode D6 is connected to this collector in series with a resistor R20. The juncture of the diode D6 and resistor R20 is connected to ground through resistor R21, while the other end of the resistor R20 is connected to a potential of +24 volts through a resistor R22. When the transistor Q5 is turned on, the positive potential appearing on its collector from its emitter passes through the diode D6 and the resistor R20 and through another diode D7 to the base of the transistor Q5′, corresponding to Q5 in the preceding allotter stage, thus shutting this transistor off.

At the same time, positive potential from the collector of transistor Q5 passes through diode D8 over a circuit leading to the input of the next allotter stage, in this case the "hold" stage. This circuit is connected to a potential of −12 volts through a resistor R23 which provides a potential drop when the positive voltage appears from the diode D8, thus blocking the diode D9 which is in series with the input of the next stage. This forms one of the inputs to the next stage. The other input is from the vertical "hold" conductor of that stage as will be explained.

Normally current from a +24 volt potential source will pass through a resistor R24 which is connected to the input circuit of the next stage and through the diode D9 and resistor R23 to the −12 volt potential. When the diode D9 is blocked, the +24 volt potential through the resistor R24 will tend to raise the potential of the base of the transistor Q4″ of the next emitter stage flip-flop. However, a diode D10, also connected to the input circuit, permits current to flow from the +24 volt source unless that diode is also blocked, as will be explained. The diode D10 provides the second input to the next stage. A diode D10′ connected between the juncture of diodes D9 and D10 is poled to prevent this point from going below the ground potential.

The positive potential which passes from the collector of transistor Q5, through diode D8, will also pass through a diode D11 to the base of a transistor Q6 of the PNP type which is normally maintained at an operating potential for the transistor by current flowing from the potential of +24 volts through resistor R24, diode D9, diode D11, resistor R25 to a potential of −12 volts. Thus, the transistor Q6 is normally held saturated by the current through the resistor R25, but is turned off when the positive potential from the flip-flop Q4, Q5 appears on the base. The emitter of this transistor is connected to a potential of +6 volts, so that the collector is normally tied to the emitter potential. The collector is connected through a diode D12 to the base of the seize transistor Q7, which base is also connected through a resistor R26 to the potential of −12 volts. The vertical "seize" conductor 12 of the associated allotter stage is connected directly to the collector of transistor Q7 while its emitter is connected directly to ground.

The fact that the transistor Q6 is normally "on" will maintain a positive potential on the base of the transistor Q7 and will thus maintain the transistor Q7 in the "off" condition. When the positive potential from the flip-flop transistors Q4, Q5 is applied to the base of transistor Q6, it turns this transistor off which permits negative potential to be applied to the base of transistor Q7 to turn this transistor on and thus connect the "seize" conductor 12 to ground through the small resistance of the collector-emitter circuit of the transistor Q7.

As long as the link associated with this particular stage is allotted, the transistor Q7 will remain on and the "seize" conductor 12 will be grounded. With the particular link (in this case the *n*th link) allotted, i.e ready to receive a call, the entire allotter circuit will remain quiescent until the link is seized by the incoming call.

As has already been described, when a call is received by a line circuit, for instance line 2, a short negative pulse is applied to the horizontal crosspoint bus 11 of that line circuit. This negative pulse will pass through the coil of the relay 16 of the allotted stage and through the diode D5, the "seize" conductor 12, and the collector-emitter circuit of the transistor Q7 to ground. The relay 16 will then operate, closing the contacts 19, 20, and 21. Closing of the contacts 20 and 21 will connect the tip and ring line leads 9 and 10 to the "tip back" and "ring back" vertical conductors 15 and 14 of the particular link, in this case the *n*th link.

The "hold" conductor 13 is connected to the collector of a transistor Q8, the emitter of which is connected through a resistor R27 to a potential of +24 volts. The base of the transistor Q8 is connected to ground through a resistor R28. These connections are sufficient to maintain the transistor Q8 normally on and therefore +24 volts is connected to the "hold" conductor 13 over the emitter-collector circuit of the transistor Q8. When the relay 16 operates to close the contact 19, the coil of the relay is connected between the horizontal crosspoint bus 11 and +24 volts over the collector-emitter circuit of the transistor Q8. Thus the circuit through the relay coil will be maintained and a positive potential will be sent to the line circuit over the horizontal crosspoint bus 11. This positive potential, as has already been described, has the effect of preventing any further negative pulse from being sent over the horizontal crosspoint bus and also to maintain the busy tone on the sleeve of the line circuit jack J1, in the case of the line circuit of Fig. 1.

The emitter of the transistor Q8 is also connected to the base of a busy sensing transistor Q9 which has its emitter connected to ground through a resistor R29 and to a potential of +24 volts through a resistor R30. The value of the resistors provides a more positive potential for the base than for the emitter which maintains the busy sensing transistor Q9 normally off. When the contact 19 of the relay 16 is closed, the increased current through the resistor R27 connected to the emitter of the transistor Q8 causes a drop in potential across that resistor which lowers the potential on the base of the transistor Q9 to turn that transistor on. This raises the potential on the collector of the transistor Q9 and this increased potential passes through a diode D13 to the base of the transistor Q7 to turn this transistor off, thus disconnecting the original operating circuit of relay 16.

*Lockout*

Once the link has been seized, it is necessary to prevent it from being seized by another line during any period when the allotter might be activated. In the brief period during which a "seize" conductor is activated when the allotter passes through a busy link, it is conceivable that seizure might occur even though the allotted time is short. Prevention of such undesirable seizure is accomplished by the busy sensing transistor Q9. This transistor senses the "hold" conductor current which exists only if the crosspoint is held closed, since the hold current causes a voltage drop across resistor R27 which saturates the transistor, clamping its collector to approximately +24 volts. As this +24 volts is applied through the diode D13 to the base of the transistor Q7, this transistor is maintained cut off all the while transistor Q9 is saturated, no matter if flip-flop activation of transistors Q4, Q5 cuts off the transistor Q6.

Under certain operating conditions, it is possible that the crosspoint could be released while the plug at the end of the link is still in the jack and before the link is ready to accept another call. To avoid this, the allotter stage is kept busy by a signal from the link until it is cleared. This signal, which is potential of −12 volts, is applied over the resistor R30 to the base of the busy-inhibit transistor Q10 which is also connected to a potential of +24 volts over a resistor R31. This operates the transistor Q10 to saturation, thus applying the potential of +12 volts which is connected to the emitter thereof to the base of transistor Q7 through the diode D13. This situation is similar to the case of an actually busy link where transistor Q9 is saturated. The output from transistor Q10 maintains the transistor Q7 cut off, notwithstanding the effect of activating the flip-flop.

*Hold stage (Fig. 5)*

The positive potential on the collector of the busy sensing transistor Q9 blocks the diode D10 which forms the second input to the succeeding stage, which in this case is the "hold" stage. The "hold" stage is designed primarily as a resting place for the allotter if all the links are busy. Should there be no such resting place, the allotter would cycle continuously if all the links were busy. Since it is undesirable to permit this condition to exist, no links are allotted in the all-busy state and the flip-flop associated with the "hold" stage remains activated until a link is freed.

Since there is no link associated with the "hold" stage, no "seize" and "hold" circuitry is required. However, other functions, which are incidental, are assigned to the "hold" stage. It is desirable to be able to reset all the allotter stages but the first, since at the time the alloter is first energized, more than one stage could be allotted. To do this, considerably more reset power is necessary than can be obtained from the flip-flop directly. Hence, an additional amplifier-transistor Q11 is provided in the "hold" stage to feed the common reset signal to all stages simultaneously. The base of the transistor Q11 is connected to the juncture of resistors R20′ and R22′ of the "hold" stage, which correspond to resistors R20 and R22 of the *n*th stage, the collector of this transistor being connected to a potential of +24 volts, and the emitter being connected through a resistor R32 to a potential of −12 volts. The common reset lead 22 is connected to the emitter of the transistor Q11 and is connected to the previously described rest circuit through a decoupling diode D14 and to the base of the transistor Q5 of the previous flip-flop circuit through a decoupling diode D15.

The "hold" circuit is substantially the same as the previously described allotter stage, with the exception that it has no link associated with it and therefore the circuitry, such as is connected to the "seize" conductor 12 and the "hold" conductor 13 of the previously described link, is omitted. Whenever the "hold" stage flip-flop, comprising the transistors Q4″ and Q5″, is activated, a positive potential is applied over the diode D16 to one input of the first link allotter stage. The other input of the first link allotter stage comes from the collector of a busy-inhibit transistor Q12 of the NPN type. This transistor also has its collector connected through a resistor R33 to a potential of +12 volts. The emitter of the transistor is connected to ground, while the base is connected to a potential of +12 volts through a resistor R34 and to ground through a diode D17 which is poled so as to prevent the base from going below ground potential.

The base of the transistor is also connected to an "and" circuit having an input P for each link circuit which is connected to point P in the several allotter stages. The "and" circuit includes a diode, such as D18, in each of the input circuits, and the negative side of the diode is connected in each case to a potential of −12 volts through a resistor such as R35.

As long as any one of the links is free, a negative potential will appear on the input P from the allotter stage of that link. This will permit current to flow through the resistor R34, so that the base of the transistor Q12 is maintained more negative than the emitter. Thus the transistor Q12 is maintained in the "off" condition and the positive potential of 12 volts will appear on the second input to the first allotter stage. Then as soon as the flip-flop of the "hold" circuit is activated to produce a positive potential on the other input, the first allotter stage will be activated.

However, if all of the link circuits are busy, positive potential will appear on all of the inputs P of the "and" circuit, and all of the diodes D18 will be blocked, thus permitting the base of the transistor Q12 to become more positive than the emitter which will cause the transistors to conduct. This causes a potential drop across the resistor R33 to place a substantially ground potential on the second input lead to the first allotter stage, so that the first allotter stage cannot be activated, even though the flip-flop of the "hold" circuit has placed a positive potential on its first input circuit. Therefore, the first link will not be allotted and the "hold" circuit will remain quiescent until a link becomes free, when the busy-inhibit transistor Q12 will shut off and the positive potential from the collector will apear on the second input to the first allotter stage, thereby activating this stage and allotting the first link for the next call to be received.

The flip-flop of the "hold" circuit may be energized, as already described, or it may be energized by a start switch 22′ which is connected in series with a resistor R36′ between the base of transistor Q5″ and ground. Thus, the "hold" circuit may be manually turned on, thus sending the positive reset potential over the bus 22 to shut off the flip-flops in all but the first allotter stage.

*Civilian line circuit (Fig. 6)*

The CBS line circuit and the magneto line circuit have already been described. The civilian line circuit is provided for the purpose of connecting the portable exchange to a civilian exchange and is illustrated in Fig. 6. Here the civilian exchange is represented by the rectangle 53 having the two leads labelled "tip" and "ring" extending from the civilian exchange to the portable exchange of the invention. The civilian line circuit is essentially a magneto circuit with a capacitor coupled input and a pair of relays to provide closure and dialling facilities. Any number of these circuits may be provided depending on the number of civilian exchanges to which connection is to be made, but only one dial is needed, since the operator would be dialling over only one line circuit at a time.

When a call is extended from the civilian exchange, a 20-cycle ringing voltage appears between the tip and the ring leads which causes a seizure of a free link over the crosspoint matrix in a manner described in connection with the magneto line circuit, and also places a low resistance choke across the tip and ring leads to terminate the ringing voltage and to apply busy tone to the jack sleeve.

On an outgoing call to the civilian exchange, when the plug from a link circuit is inserted in the jack, the choke is again placed across the line and busy tone is applied to the jack sleeve. Also in response to a signal from the link, to be later described, the dial is cut into the line, thus permitting the operator to dial a number into the civilian exchange.

When a call is received, the 20-cycle ringing voltage from the ringing signal passes through the capacitors C28 and C29 and the chokes 54 and 55 to a rectifier bridge D21 which supplies a negative output over a Zener diode Z5 to a pulser circuit comprising a transistor Q28. This pulser transistor has its base connected to one end of the primary of a transformer T6, one secondary of which has one end connected to −24 volts and the other end to the collector of the transistor Q28. A capacitor C30 is connected between the collector and base of the transistor and the emitter is connected through a resistor R77 to ground. The input of the pulser circuit from resistor R76 is connected to the end of the primary of the transformer T6 remote from the base of the transistor, and is also connected to ground through a capacitor C31.

Another secondary 56 of the transformer T6 has one end connected to a potential of +24 volts and to the base of an amplifier transistor Q29. The other end of the secondary 56 is connected to ground through a capacitor C32. The emitter of the amplifier transistor Q29 is connected to the horizontal crosspoint bus which leads to the crosspoint matrix shown in Fig. 3. The emitter is also connected through a diode D22 in series with a resistor R78 to ground, the diode being poled for easy current flow towards ground.

With this arrangement, the pulser transistor Q28 is caused to oscillate when a negative potential is applied to the base of the transistor through the primary of the transformer T6, and an oscillating voltage is induced in the secondary 56 and amplified by the amplifier transistor Q29 and thus sent over the horizontal crosspoint bus to cause the link allotter to seize a free link in a manner already described in connection with the allotter circuit.

When link seizure takes place, the positive voltage applied to the horizontal bus from the allotter circuit passes through the diode D22 and resistor R78 to ground. The juncture of diode D22 and resistor R78 thus becomes more positive because of the voltage drop across resistor R78, and this positive potential is fed through a diode D23 to the input circuit of the pulser transistor Q28 to prevent it from conducting, and thus prevent further pulsing, even though ringing voltage is still applied across the tip and ring input of the civilian line circuit. A diode D24 is connected between the negative side of the diode D23 to ground to prevent this point from ever going below ground potential. This point is also connected to the secondary 56 through a resistor R79.

The positive voltage from the horizontal crosspoint bus, as developed across resistor R78, also is used to gate the busy tone to the jack J2 so that the circuit will appear busy to an operator attempting to plug a link into it. For this purpose the positive voltage across resistor R78 is also fed through a diode D25 and an inductor 57 to the base of a transistor Q30 of the NPN type which acts, in addition to a normal emitter follower busy-tone gate, as part of a D.C. amplifier consisting of transistors Q30 and Q31 for a purpose to be explained. The base of transistor Q30 is also connected to ground through a resistor R80 and to a potential of −17 volts through a resistor R81 in order to maintain a normal bias on the base. The base also receives busy tone from the busy tone generator of Fig. 7. To this end it is connected through a capacitor C33 to a source of busy tone. The emitter of the transistor Q30 is connected through a load resistor R82 to ground and forms the output of the gate through a capacitor C34 which connects to one terminal of the primary of transformer T7, the other end of the primary being connected to ground. The secondary of transformer T7 has one end connected to the sleeve of the jack J2 and the other to a source of bias potential of −12 volts.

When the transistor Q30, which, it will be remembered, is of the NPN type, receives the positive potential on its base, it acts as a grounded emitter amplifier, thus applying the busy tone through the base-emitter circuit and capacitor C34 to the transformer T7 which applies this tone to the sleeve of the jack J2.

The purpose of the direct current amplifier circuit of transistors Q30 and Q31 is to stop the ringing current from the civilian exchange when the link has been seized. To this end the collector of the transistor Q30 is connected over a load resistor R83 to a potential of +12 volts and is also directly connected to the base of the transistor Q31 which is also connected to a potential of +24 volts over a resistor R84 and to ground over a capacitor C35. The resistors R84 and R83 form a voltage divider which normally maintains the base of transistor Q31 at a positive potential to keep it in the "off" condition. The emitter of the transistor Q31 is connected to at potential of +12 volts, while the collector is connected to one end of the winding of a relay 58, the other end of which is connected to a potential of −12 volts.

When the positive potential appears on the horizontal crosspoint bus upon the seizure of a link, the transistor Q30 becomes conducting, as has already been explained, and this causes the base of transistor Q31 to be lowered in potential so as to cause transistor Q31 to conduct. This energizes the relay 58, thus closing its contacts 59 to connect a low resistance choke 60 between the tip and ring wires leading to the civilian exchange 53. The connection of this choke 60 across the tip and ring leads has the same effect as when the called party of a civilian exchange answers, thus terminating the ringing from the civilian exchange.

When an outgoing call is being made, the insertion of a plug into the jack J2 will cause the contacts 61 to be closed under control of the tip spring. The potential of +12 volts on the movable spring of the contact is thus applied to the base of the transistor Q30 through a resistor R85 and an inductor 57. Thus, the transistors Q30 and Q31 are caused to conduct, the former causing the busy tone to be applied to the sleeve of the jack J2, as already explained, and the latter operating the relay 58 to connect the choke 60 across the leads.

It is now necessary to connect a telephone dial into the circuit so that the operator can dial the wanted number, and this is accomplished in the following manner: The ring back lead in the link circuit is connected to ground when the link is seized, and thus when the plug is inserted, the ring lead in the civilian line circuit receives this ground potential. This ring lead is connected through a choke 62, a diode D26, and a resistor R86 to the base of a transistor Q32 of the NPN type. This base is also connected to the juncture of two resistors R87 and R88 in series, the former being connected to a potential of −12 volts and the latter to a potential of −24 volts. These resistors form a voltage divider which maintains the transistor in the "off" condition.

The emitter of the transistor Q32 is connected to a potential of −12 volts. The collector is connected to one end of a winding of a relay 63 whose other end is connected to ground. This relay is shunted by a diode D28 whose cathode is connected to ground. The diode D28 prevents any chance of the relay 63 from operating on a positive potential.

When the ring terminal of the jack is provided with a ground potential by the insertion of a link plug, the potential on the base of the transistor Q32 is raised, which causes the transistor Q32 to conduct, since it is of the NPN type, thus causing current to flow through the coil of the relay 63 to operate the relay.

A telephone dial 64 is mounted on the switchboard at the operator's position and is normally disconnected from the line circuit by open contacts 65, 66, and 67 of the relay 63. When the relay operates, a break contact of the contact 67 opens the circuit of the choke 60, disconnecting it from the tip and ring leads at the same time that the tip and ring leads are connected over the closed make contacts 66 and 67 to the interrupter spring 68 of the dial. The closed make contacts 65 and 66 of the relay 63 connect the choke across the dial contact 69. The operator is then free to dial the wanted number into the civilian exchange. Only one dial is required for any number of civilian lines with this circuit, the dial connections being multipled to the relays corresponding to relay 63 of other line circuits.

*Trunk line circuit,* (*Fig. 7*)

The two primary functions of the trunk line circuit shown in Fig. 10 are to seize a link when a burst of tone No. 1 is received over the trunk and to gate a burst of tone No. 3 on to the trunk when either the plug of the link is pulled from the trunk circuit jack or when the circuit is idle and when a burst of tone No. 2 is received. In addition, between the time that seizure is accomplished and the link is released, the trunk line circuit is required not to respond to any tone.

Another incidental function of the trunk line circuit is the indication on the jack panel as to which trunk in a group is idle and available for use. As in the link circuit, tone detection is achieved by reed relays; however, the trunk line circuit requires response only to tones No. 1 and No. 2.

The input of the trunk line circuit appears in the upper left hand corner of Fig. 7 as connected to the tip and ring leads of a trunk through capacitors C36 and C37, respectively. The three-lead output of the trunk line circuit is shown at the upper right corner leading to the crosspoint matrix and is connected thereto similarly to the outputs of the other line circuits. The primary of a transformer T8 is connected across the tip and ring leads through a capacitor C38 to prevent direct current from flowing between the tip and ring leads, since the potentials of these leads are maintained independent for local signalling purposes. The secondary of the transformer T8 has one end connected to ground and the other connected to the emitter of a gating transistor Q33 of the PNP type through a time constant circuit comprising resistor R89 shunted by a capacitor C39. The collector of this transistor is connected to a potential of −12 volts, while the base is connected to another portion of the circuit to be later described.

On an incoming call, tone No. 1 from the trunk enters the primary of transformer T8 through capacitor C38. The voltage of the tone is stepped down in the secondary between ground, as connected to one end thereof, and a tap 70 connected to a point along the winding, to about ⅙ of the primary voltage. This is done to increase the impedance of an amplifier transistor Q34, as seen by the line, the base of which transistor is connected to the tap 70 through a capaction C40.

In the idle condition, the transistor Q34, which is of the PNP type, is conducting, its base also being connected to ground in a path including resistor R90, the collector-emitter saturation resistance of an NPN type transistor Q35, which is normally on, and resistor R91 at the upper right corner of the figure. The transistor Q34 acts as a grounded emitter-amplifier with its emitter connected through a resistor R92 and a resistor R93 to a potential of +12 volts. The juncture of the resistors is connected by a capacitor C41 to ground. This circuit provides negative feedback for the transistor Q34. The collector of the transistor Q34 is connected through the primary of a transformer T9 to a potential of −12 volts. The gain of the transistor Q34 is augmented by the transformer T9, the secondary of which feeds the induced voltage of the received tone to the base of a transistor Q36. For this purpose a resistor R94 is connected across the secondary of transformer T9 and one end of the secondary is connected to the base of a transistor Q36 of the NPN type, while the other end is connected to ground. A tap 71 on the secondary is connected to ground through two parallel but oppositely poled diodes D29 and D30.

The shunting resistor R94 is used to reduce the effects on gain of the varying input resistance of the transistor Q36. The diodes D29 and D30 limit the value of the tone voltage to approximately one or two volts peak-to-peak at the base of transistor Q36. Temperature compensation of transistor Q36 is partially achieved by the use of negative feedback in the emitter through resistors R95 and R96 in series, the latter being connected to a potential of −12 volts and the juncture of the two resistors being connected to ground over a capacitor C42.

The collector of the transistor Q36 is connected through the primary of a transformer T10 to a potential of +12 volts through a resistor R96′, the juncture of the transformer primary and the resistor R96′ being connected to ground through a capacitor C43. The circuit comprising the resistor R96′ and capacitor C43 provides collector decoupling for the transistor Q36.

The secondary of the transformer T10 has a capacitor C44 connected across it forming a low-Q tank circuit, as seen from the collector of transistor Q36, tuned to the mean of the frequencies of tone No. 1 and tone No. 2, about 2020 cycles.

In order to provide uniform loading on the tank circuit, a rectifier bridge D31 is provided across the secondary of the transformer T10 to demodulate the tones. A reed relay 72 is operated by the demodulated current from the rectifier bridge D31. A step-up ratio is used in transformer T10, since the reed relay coil 72 is of relatively high impedance. This reed relay is similar to those already described and its coil is connected across the rectifier bridge D31 through a capacitor C45.

The reed relay has two reed contacts 73 and 74, the contact 73 being tuned to tone No. 1, while the contact 74 is tuned to tone No. 2. Up to this point, the trunk circuit is common for both tones No. 1 and No. 2 but the contacts 73 and 74 of the reed relay provide a divergence between the paths of the two signals. When a demodulated tone appears across the coil of the relay 72, only the reed corresponding to that tone is vibrated, causing it to make contact for the space of several tens of microseconds with the fixed stud associated with that reed. Each of the reeds is connected to a potential of −24 volts, and hence, when a reed vibrates, pulses of −24 volts potential are applied to the associated fixed studs. The pulses from these two fixed studs are fed into the two branching circuits which induce the appropriate responses to the two tones.

Tone No. 1 is emitted by a link circuit when that circuit is calling over a trunk in order to seize a link circuit at the called switchboard. When tone No. 1 is received over the trunk, the contact 73 will vibrate to feed negative pulses over series resistors R97 and R98 to the base of an emitter follower transistor Q37 of the PNP type. The base of this transistor is also connected over a resistor R99 to a potential of +24 volts normally to maintain a positive bias on the base, while the juncture of resistors R97 and R98 is connected over a capacitor C46 to ground. The collector of the transistor Q37 is connected directly to a potential of −24 volts, while its emitter is connected to ground through a load resistor R100.

The transistor Q37 is ordinarily cut off, since its base is more positive than its emitter, but the negative pulses received on the base cause it to yield similar pulses to its emitter output. A resistor R101 is connected between the emitter of transistor Q37 and the base of a transistor Q38, also of the PNP type, whose collector is connected directly to a potential of −12 volts and whose emitter is connected to ground over a load resistor R102 shunted by a diode D31′ and a capacitor C46′. The diode is poled to prevent the emitter from rising above ground potential. The base of transistor Q38 is also connected to a potential of +12 volts over a time constant network comprising an integrating capacitor C47 shunted by a resistor R103. The resistor R101 provides collector current limiting for the transistor Q37, while the capacitor C47 integrates the pulses from the emitter of transistor Q37 to provide a negative direct current potential on the base of transistor Q38.

The transistor Q38 is normally off, and when it is turned on by the effect of tone No. 1, it supplies a negative potential to the base of a pulsing transistor Q39 of the PNP type over resistor R104 and the primary of a transformer T11. The resistor R104 limits the drive to the base of transistor Q39. The pulsing transistor Q39 is similar to the pulsing transistor Q1 of the CBS line circuit of Fig. 1 and the pulsing transistor Q28 of the civilian line circuit of Fig. 9. One secondary of transformer T11 is connected between the collector of the transistor Q39 and a potential of −24 volts, while a capacitor C48 is connected between the collector and the base of this transistor. The emitter of transistor Q39 is connected to ground over a resistor R105. As in the previously described pulser circuits, a second secondary 75 is provided on the transformer T11 and has one end connected to the base of the amplifier transistor Q40 and is also connected to a potential of +24 volts through a resistor R106. The other end of the secondary 75 is connected to ground through a capacitor C50.

The transistor Q40, which is of the PNP type, is normally off, and the pulsing output of transistor Q39 produces negative pulses on the base of transistor Q40 which cause it to become conductive following the pulses. The collector of the transistor Q40 is connected to a potential of −24 volts while its emitter is connected over a diode D32 and the resistor R91 to ground, the latter forming the load resistor. The output is from the emitter which is connected to the horizontal cross-point bus leading to the crosspoint matrix. Negative pulses are produced on the horizontal crosspoint bus by the amplifier Q40 whenever tone No. 1 appears in the input of the trunk circuit. The manner in which a single negative pulse seizes an allotted link circuit has already been described in connection with the crosspoint link allotter system of Figs. 3, 4 and 5.

When tone No. 2 appears, the contact 74 of the reed relay 72 vibrates and negative pulses at the frequency of vibration are applied over the resistors R107 and R108, in series, to the base of a transistor Q41 which is cascaded with a transistor Q42. Both of these transistors are of the PNP type. The juncture of resistors R107 and R108 is connected to ground over a capacitor C51. The base of transistor Q41 is also connected to a potential of +24 volts over a resistor R109 to give it a normal positive bias. The collector of the transistor Q41 is directly connected to a potential of −24 volts, while its emitter is connected to a potential of +24 volts over a load resistor R110. The output from the emitter is directly connected to the base of transistor Q42. The collector of the transistor Q42 is directly connected to a potential of +24 volts, while its emitter is connected over resistors R111 and R112 in series to ground. The juncture of resistors R111 and R112 is connected over an integrating capacitor C52 to the base of a transistor Q42′ also of the PNP type. This base is given a bias potential by connecting it to a potential of −12 volts over a resistor R113 and to ground over a resistor R114.

Tone No. 2, being amplified by cascaded transistors Q41 and Q42, is partially integrated by capacitor C52. The transistor Q42′ has its collector connected to a potential of −24 volts over a load resistor R115 and its emitter connected directly to a potential of +12 volts. Under these conditions, the transistor Q42′ is normally saturated and its collector potential is thus clamped to a potential of +12 volts. When the pulses occur, the average base voltage of transistor Q42 goes more positive than the emitter, so that transistor Q42′ is shut off and the collector potential goes negative.

As a result of the shutting off of transistor Q42′, two effects occur. The negative potential from the collector of Q42′ causes a transistor Q43 of the PNP type to saturate, thus clamping the base of another transistor Q44 of the PNP type to a potential of +24 volts. The transistor Q43 saturates because its base is connected over a resistor R116 and a diode D33 to the collector of transistor Q42′. The base of transistor Q43 is also connected to a potential of +24 volts over a resistor R117 to give it a bias potential. Normally no current can flow through resistors R117, R116, anad R115 because diode D33 is blocked by the positive potential on the collector of transistor Q42′ in its "on" condition. However, when this transistor is shut off by the positive potential applied to its base, current can flow in the just-mentioned circuit, so that the base of transistor Q43 becomes more negative and this transistor is turned on to apply the positive 12 volts from its emitter over its collector to the base of transistor Q44. The collector of transistor Q44 is connected through a load resistor R118 to a potential of −24 volts, while its emitter is connected to ground through a resistor R119 and to a potential of +24 volts through a resistor R120. The value of these last-mentioned resistors is such as normally to provide a potential of approximately six volts on the emitter of transistor Q44. The application of the plus potential to the base of transistor Q44 thus cuts off this transistor. The base of transistor Q44 is also connected over a resistor R121 and a diode D34 to the juncture of resistor R116 and diode D33. The juncture of resistor R121 anad diode D34 is also connected to a potential of +24 volts over a resistor R122 and to a potential of +12 volts over a capacitor C53. When the transistor Q42′ is shut off, thus making its collector negative in potential, current will flow from the potential of +24 volts through resistor R122 and diodes D34 and D33 to the collector of transistor Q42′, with the result that capacitor C53 is charged negatively very rapidly owing to potential drop across resistor R121. When tone No. 2 ends, the base of transistor Q42′ begins to conduct again and the transistor becomes saturated, clamping its collector potential to +12 volts. The transistor Q43 is then cut off, since its base is raised to +24 volts over resistor R117. However, a considerable negative potential still remains at the juncture of resistor R122 and capacitor C53, and since transistor Q43 is cut off, its collector resistance is high and capacitor C53 has a much higher resistance in its discharging path than in its charging path, the discharging path being resistor R122 in parallel with the input resistance R121 of transistor Q44. This produces a time constant for the discharge of capacitor C53 of about two seconds.

After transistor Q43 is cut off, the charge on capacitor C53 causes transistor Q44 to conduct. A transistor Q45 of the NPN type has its base connected to the collector of transistor Q44, while its emitter is connected to a potential of −12 volts. The collector of transistor Q45 is connected over resistors R123 and R124 in series to a potential of +24 volts, the resistor R124 being shunted by a capacitor C54. The continued conduction of transistor Q44 causes the base potential of transistor Q45 to go more positive than its emitter, so that it will also conduct.

The juncture of resistors R123 and R124 is connected to the collector of transistor Q35 over a diode D35 in series with a resistor R125, diode D35 being poled so as to prevent current from flowing towards the transistor Q35.

Ordinarily, the potential at the juncture of resistors R123 and R124 is about +18 volts, since the diode D35 prevents the saturated transistor Q35 from reducing it. The potential passes through an inductor 76 to the base of the transistor Q33 normally to hold it cut off. This transistor is the gate for tone No. 3, which is applied to the base of transistor Q33 over a capacitor C55 from a terminal 76′ connected to terminal 26′ of the tone generator of Fig. 6. When transistor Q45 conducts, it lowers the potential on the base of transistor Q33, so that it conducts. Since tone No. 3 is also applied to the base of transistor Q33, its emitter supplies tone No. 3 as well. The tone is thus applied across the entire secondary of transformer T8 and is fed across the line by the transformer winding.

Gating of tone No. 3 also occurs when a link plug, which has been inserted in the jack J8, is removed. As soon as the plug is inserted in the jack, a potential of −12 volts is applied over the make contact 77′, controlled by the tip spring of the jack, to the jack side of a resistor R126 (extreme right of figure), whose other end is connected to the juncture of diodes D34 and D33. Capacitor C53 is charged negatively by this voltage through resistor R126 and diode D34, but is prevented from energizing transistor Q44 by the inhibiting action of transistor Q43 which is saturated by the same voltage that charges capacitor C53. When the plug is removed, the charging voltage is removed, transistor Q43 shuts off, and the voltage on capacitor C53 energizes transistor Q44 but is prevented from holding transistor Q43 saturated by the diode D34. Tone No. 3 is then gated on to the trunk by the operation of transistors Q44 and Q45 which function the same as when activated by tone No. 2.

When tone No. 3 is gated onto the trunk, it also feeds into the amplifier Q34 which is active. Although the tone No. 3 causes a demodulated signal to appear across the reed relay coil 72, there is no effect, since the trunk reed relay has no reed sensitive to tone No. 3. The amplifier transistor Q34 is saturated, however, and will not respond to any other tone as long as tone No. 3 exists.

In order to disable amplifier transistor Q34 after the link has been seized by an incoming call, an inhibiting voltage is applied to transistor Q34. This inhibiting voltage is produced by means of the transistor Q53. The base of this transistor is connected to the ring lead over a resistor R127 and to a potential of +24 volts over a resistor R128. The base is also connected to ground over a diode D35′. The collector of transistor Q35 is connected to the base of the transistor Q34 over the resistor R90, already mentioned. The collector is also connected to a potential of +24 volts over a resistor R129. When either the link has been seized on an incoming call or the plug has been inserted in the jack on an outgoing call, transistor Q35 is cut off. On an incoming call the positive feedback across resistor R91 from the horizontal crosspoint bus, which inhibits the pulser, also cuts off NPN type transistor Q35, since the juncture of diode D32 and resistor R91 is connected to the emitter of this transistor and the emitter thus becomes more positive than the base. When the plug has been inserted in the jack, the link causes the ring potential to become nearly −12 volts which is thus applied over resistor R127 to the base of transistor Q35. When the transistor Q35 is cut off, positive potential from its collector is applied to the base of transistor Q34, thus cutting off this transistor. This prevents the application of tone No. 3 to the trunk when tone No. 2, which is used for signalling between switchboards, appears. The inhibit system also prevents the trunk line circuit from seizing a crosspoint of its own switchboard when tone No. 1 is placed on the outgoing line by the link when the plug is inserted into the jack.

In addition to the cutting off of transistor Q34, the cutting off of transistor Q35 also causes a transistor Q46 of the NPN type to conduct. This transistor has its base connected through a resistor R130 to the collector of the transistor Q35. The base of transistor Q46 is also connected to a potential of −24 volts through a resistor R131. The collector of the transistor Q46 is connected to a potential of +24 volts, while its emitter is connected to one end of the winding of a relay 77, the other end of which is connected to ground. When the transistor Q35 is cut off, positive voltage from the collector is applied to the base of transistor Q46, thus causing this transistor to conduct and operate relay 77. The armature 78 of the relay 77 is connected to ground through a resistor R132 and the break contact thereof is connected to an idle trunk lamp 78′, the other terminal of which is connected to a potential of −24 volts. When the relay 77 operates, the connection through the idle trunk lamp is disconnected but the make contact of armature 78 connects ground through resistor R132 to a conductor 79 which leads to the armature of a relay similar to the relay 77 in the next trunk circuit to light the lamp associated with that trunk circuit if the trunk is idle.

When transistor Q35 is cut off by an incoming call, accidental plugging in and removal of a plug into the busy trunk jack J8 will not place tone No. 3 onto the line because of the additional cut-off bias placed on the base of transistor Q33 by the potential on the collector of transistor Q35. This bias is sufficiently high, so that if transistor Q45 is full conducting, the base voltage at transistor Q33 will not go sufficiently negative to cause tone No. 3 to go out over the trunk.

While we have described above the principles of our invention in connection with specific apparatus, it is to be clearly understood that this description is made only by way of example and not as a limitation to the scope of our invention as set forth in the objects thereof and in the accompanying claims.

What we claim is:

1. In a telephone central office comprising a plurality of circuits over which calls to the office are received, each of said circuits having tip and ring conductors and a third conductor, means responsive to receipt of a call for transmitting a signal over said third conductor, and a link having tip and ring conductors, the combination of means responsive to a circuit receiving a call for automatically connecting said circuit to said link, said means comprising a crosspoint matrix, a transistor having two electrodes, means normally providing a low resistance between said electrodes, means including said two electrodes connected to the third conductor of all said circuits and responsive to a signal on any one of said third conductors for connecting the tip and ring conductors of the associated circuit to the tip and ring conductor of said link, and means responsive to the operation of said connecting means for increasing the resistance between said transistor electrodes.

2. In a telephone central office, the combination, as defined in claim 1, in which the crosspoint matrix comprises a plurality of reed relays, one for each crosspoint, the connecting means responsive to a signal on the third conductor of a circuit comprising a seize conductor common to all the circuits and including the electrodes of the transistor, the coil of each reed relay being connected between said common seize conductor, and the third conductor of the associated circuit, a hold conductor, common to all said circuits, and means responsive to the operation of said reed relay for transferring current flowing through said relay coil from said seize conductor to said hold conductor.

3. In a telephone central office, the combination, as defined in claim 2, in which the means responsive to the operation of the reed relay for transferring the current flowing through the relay from the seize conductor to the hold conductor comprises a contact of said relay for connecting said relay to said hold conductor, the means for increasing the resistance between the transistor electrodes comprising means connected to said hold conductor and responsive to current flowing therethrough for changing the operation of said transistor, effectively to open the seize conductor circuit through said relay.

4. In a telephone central office comprising a plurality of circuits over which calls to the office are received, each of said circuits having tip and ring conductors and a third conductor, means responsive to receipt of a call for transmitting a signal over said third conductor, and a plurality of links each having tip and ring conductors, the combination of means responsive to a circuit receiving a call for automatically connecting said circuit to a free one of said links, said means comprising a crosspoint matrix, a plurality of seize conductors intersecting the third conductors of said circuits at the crosspoints of said matrix, there being one seize conductor for each link, control means connected to each seize conductor for closing a crosspoint of the matrix between that conductor and the third conductor of a circuit responsive to a signal on said third conductor, means for successively energizing said control means, and means responsive to the free condition of a link associated with a control means for enabling said control means when said control means is energized.

5. In a telephone central office having a plurality of line and trunk circuits and a plurality of links, and means for automatically connecting a link to one of said circuits, an allotter for said links comprising a plurality of allotter stages, one for each link, each of said stages comprising a pair of transistors, connected as a flip-flop circuit, an "and" circuit having two inputs and an output, said output being connected to said flip-flop circuit to operate said flip-flop circuit when both said inputs are energized, means for energizing one of said inputs when the link associated with the previous stage is busy, and means for energizing the other of said inputs when the flip-flop circuit of the previous stage is operated, and means connected to the output of said first-mentioned flip-flop circuit to enable the link associated therewith to be seized when said flip-flop circuit is operated, whereby the flip-flop circuits of said stages will operate in sequence until one associated with a free link is found.

6. In a telephone central office, the combination, as defined in claim 5, further comprising means connected to the output of each flip-flop circuit for resetting the flip-flop circuit of the next previous stage to its unoperated condition.

7. In a telephone central office, the combination, as defined in claim 5, in which the means for energizing one of the inputs of the "and" circuit when the link associated with the previous stage is busy comprises a transistor in each stage, means for causing said transistor to conduct when the link associated with that stage is busy, and means for producing a potential on said one input of the "and" circuit of the next stage when said transistor is conducting to energize that input.

8. In a telephone central office, the combination, as defined in claim 5, further comprising a second transistor in each stage, means for normally maintaining said second transistor conducting when the link associated with that stage is free, so as to enable the seizure of said link by a calling circuit, and means for rendering said second transistor non-conductive when the first transistor becomes conductive so as to prevent other circuits from seizing the link associated therewith.

9. In a telephone central office, the combination, as defined in claim 8, further comprising means in each stage of the allotter connecting said second transistor with the output of the flip-flop circuit of the previous stage for rendering said second transistor conductive when the flip-flop circuit of the previous stage is operated and the first transistor is non-conducting.

10. In a telephone central office, the combination, as defined in claim 5, further comprising a hold stage in the allotter connected between the last stage and the first stage, so as to connect the stages in ring formation, said hold stage comprising a pair of transistors connected as a flip-flop circuit, an "and" circuit having two inputs and an output, said output connected to said flip-flop circuit to operate said flip-flop circuit when both inputs of said "and" circuit are energized, means for energizing one of said inputs when the flip-flop circuit of the last stage is operated, means connected to all of the stages for energizing the other input circuit when any one of the links is free, and means for connecting the output of said "hold" stage flip-flop circuit to one of the inputs of the "and" circuit of said first stage, whereby the sequential operation of the flip-flop circuits is stopped at the "hold" circuit if all the links are busy.

11. In a telephone central office, the combination, as defined in claim 10, further comprising means connected to the output of the flip-flop circuit in the "hold" stage of the allotter and connected to the inputs of the flip-flop circuits in all the allotter stages except the first stage for simultaneously resetting all said flip-flop circuits when said flip-flop circuit in said "hold" stage is operated.

References Cited in the file of this patent

UNITED STATES PATENTS

| | | |
|---|---|---|
| 1,026,328 | Parker | May 14, 1912 |
| 2,119,211 | Holden | May 31, 1938 |
| 2,706,222 | Bjornson | Apr. 12, 1955 |
| 2,794,121 | Bjornson | May 28, 1957 |
| 2,829,205 | Elliott | Apr. 1, 1958 |
| 2,842,622 | Bakker | July 8, 1958 |